United States Patent
Lu

(10) Patent No.: US 9,975,404 B2
(45) Date of Patent: May 22, 2018

(54) VEHICLE POWER ADJUSTING DEVICE

(71) Applicant: ATALI TECHNOLOGY CO., LTD, Taipei (TW)

(72) Inventor: Jui-Hsuan Lu, Taipei (TW)

(73) Assignee: ATALI TECHNOLOGY CO., LTD, Taipei (TW)

( * ) Notice: Subject to any disclaimer, the term of this patent is extended or adjusted under 35 U.S.C. 154(b) by 90 days.

(21) Appl. No.: 15/100,971

(22) PCT Filed: Sep. 10, 2014

(86) PCT No.: PCT/CN2014/086208
§ 371 (c)(1),
(2) Date: Jun. 1, 2016

(87) PCT Pub. No.: WO2016/000314
PCT Pub. Date: Jan. 7, 2016

(65) Prior Publication Data
US 2016/0303947 A1 Oct. 20, 2016

(30) Foreign Application Priority Data

Jul. 1, 2014 (CN) .......................... 2014 1 0309399

(51) Int. Cl.
*B60H 1/32* (2006.01)

(52) U.S. Cl.
CPC ... *B60H 1/3208* (2013.01); *B60H 2001/3261* (2013.01); *B60H 2001/3266* (2013.01); *B60H 2001/3273* (2013.01)

(58) Field of Classification Search
CPC .......... B60H 1/3208; B60H 2001/3261; B60H 2001/3266; B60H 2001/3273
USPC ..................................................... 62/133, 230
See application file for complete search history.

(56) References Cited

U.S. PATENT DOCUMENTS

2006/0204368 A1* 9/2006 Imai ..................... B60H 1/3216
417/212

* cited by examiner

*Primary Examiner* — Marc Norman

(57) ABSTRACT

A vehicle power adjusting device, applied in auxiliary dynamic loads on a vehicle comprises a control chip, a temperature sensor, a speed detecting wire, and a relay; when the power for starting the vehicle is insufficient, auxiliary dynamic load is closed to release power, such that the power for starting is sufficient, so as to decrease the accelerating time, reduce toxic emission and enable the auxiliary dynamic load by using the surplus power during the cruising vehicle and the wasted power during the decelerating vehicle, thereby achieving the purpose of reducing the energy consumption, having powerful starting, completing combustion, reducing exhaust gas, and also saving fuel, reducing carbon emission and protecting environment effects.

2 Claims, 4 Drawing Sheets

VEHICLE POWER ADJUSTING DEVICE

CROSS-REFERENCE TO RELATED APPLICATION

This application claims priority from International Application No. PCT/CN2014/086208, filed 10 Sep. 2014, the contents of which are hereby incorporated by reference in their entirety for all purposes.

FIELD OF THE INVENTION

The present invention relates to a vehicle power adjusting device, particularly to a vehicle power adjusting device applied with auxiliary dynamic loads on a vehicle.

BACKGROUND OF THE INVENTION

Vehicle power generated by a motor or an engine is mainly transmitted to tires to make the vehicle moving forward, and is secondly transmitted to auxiliary dynamic loads, such as a compressor of an air-conditioning system, an air compressor, and a generator, however, the power will be reduced about 15%-20% for the engine while transmitting to the auxiliary dynamic load, and power will be reduced more, even if driving in the city.

The power used in vehicle as shown in FIG. 1 can be mainly divided into three conditions: "A" represents an underpowered condition which is usually happened, when the vehicle starts to move [part a] or reaccelerates [part b]; "B" represents an overpowered condition which is usually happened, when the vehicle is in a constant cruising speed; "C" represents a power wasted condition which is usually happened, when the vehicle is decelerated or is in braking. Therefore, the conventional vehicles are easy to produce power excessive or wasted condition.

Condition 1, the underpowered: when the vehicle just starts moving, the speed accelerated from zero to the cruising speed is needed to supply more power, thus the engine of the current vehicle is designed to a larger displacement to improve power that the range of the displacement is from 800 cc to 3000 cc. But, the larger air capacity for the vehicle, the more carbon monoxide will be produced and the more serious air pollution will be caused.

Condition 2, the overpowered: when the vehicle just starts moving and accelerate in 9-15 seconds for cruising speed, at this time the vehicle will maintain cruising speed in accordance with Newton's laws of motion excluding wind and friction, so the larger displacement vehicle will supply surplus power to maintain the speed.

Condition 3, the power wasted: the vehicle is decelerated from the cruising speed by braking to eliminate inertial force, which is the power waste.

When driving the car with opening the air condition, the power will be consumed more 20 percent that is high consumption of energy.

In view of this, how to improve a vehicle power adjusting device that can make the vehicle with more power when the vehicle just starts moving or accelerates, and has an effect of reducing oil consumption and saving energy, has become the subject of the present invention.

SUMMARY OF INVENTION

The purpose of the present invention is to provide a vehicle power adjusting device which can shut down the auxiliary dynamic load when the vehicle just starts moving or is in an insufficient power situation.

For solving the above mentioned problems, the first embodiment of the prevent invention is that a vehicle power adjusting device (100), applied with auxiliary dynamic loads on a vehicle, comprising:

a control chip (1), a temperature sensor (2) electrically connected with the control chip (1), a speed detecting wire (3) electrically connected with the control chip (1), and a relay (4) corresponding to each auxiliary dynamic load, the vehicle power adjusting device (100) being configured as an external device on the vehicle; the temperature sensor (2) configured to sense the temperature inside the vehicle; the speed detecting wire (3) configured to detect the vehicle speed; the relay (4) configured to start and close the auxiliary dynamic loads; when the vehicle is started or accelerated, or an throttle is increased, the control chip (1) can obtain the vehicle speed and temperature through the temperature sensor (2) and the speed detecting wire (3), and control operation of the relay (4) through a predetermined program installed therein.

More preferably, wherein the control chip (1) can turn the relay (4) off for 9 to 38 seconds based on the temperature inside the vehicle provided by the temperature sensor (2).

More preferably, wherein the auxiliary dynamic load comprises at least one of following or a combination thereof: a compressor (200), an air compressor (300), and an alternator (400).

For solving the above mentioned problems, the second embodiment of the prevent invention is that a vehicle power adjusting device (100), applied with auxiliary dynamic loads on a vehicle, comprising: a control chip (1) electrically connected with the auxiliary dynamic loads, a temperature sensor (2) electrically connected with the control chip (1), a speed detecting wire (3) electrically connected with the control chip (1), a relay (4) corresponding to each subsidiary dynamic load, a control panel (5), and a control switch (6), the vehicle power adjusting device (100) being configured as an internal device on the vehicle; the temperature sensor (2) configured to sense the temperature inside the vehicle; the speed detecting wire (3) configured to detect the vehicle speed; the control panel (5) disposed inside the vehicle for controlling operation or the vehicle; the control switch (6) disposed on the control panel (5) for controlling operation of the vehicle power adjusting device (100); the relay (4) configured to start and close the corresponding auxiliary dynamic loads; when the vehicle is started or accelerated, or an throttle is increased, the control chip (1) can obtain the vehicle speed and temperature through the temperature sensor (2) and the speed detecting wire (3), and control operation of the relay (4) and other auxiliary dynamic loads electrically connected therewith via a predetermined program installed therein.

More preferably, wherein the control chip (1) turns the relay (4) of for 9 to 38 seconds based on the temperature inside the vehicle provided by the temperature sensor (2) and/or the speed provided by the speed detecting wire (3).

More preferably; wherein the auxiliary dynamic load comprises at least one of following or a combination thereof: a compressor (200), an air compressor (300), a generator (400); wherein the auxiliary dynamic load being electrically connected with the control chip (1) is the compressor (200).

Compared with the prior art, the present invention has the beneficial effects are that the control chip detects the vehicle power condition, when vehicle is underpowered, the auxiliary dynamic load will be shut down for a few seconds to provide enough power for saving the oil consumption.

Secondly, the vehicle power adjusting device can be used in the external or internal type which will not only generate enough power, but also save more energy for the vehicle.

DETAILED DESCRIPTION OF THE PREFERRED EMBODIMENTS

Figure 1:
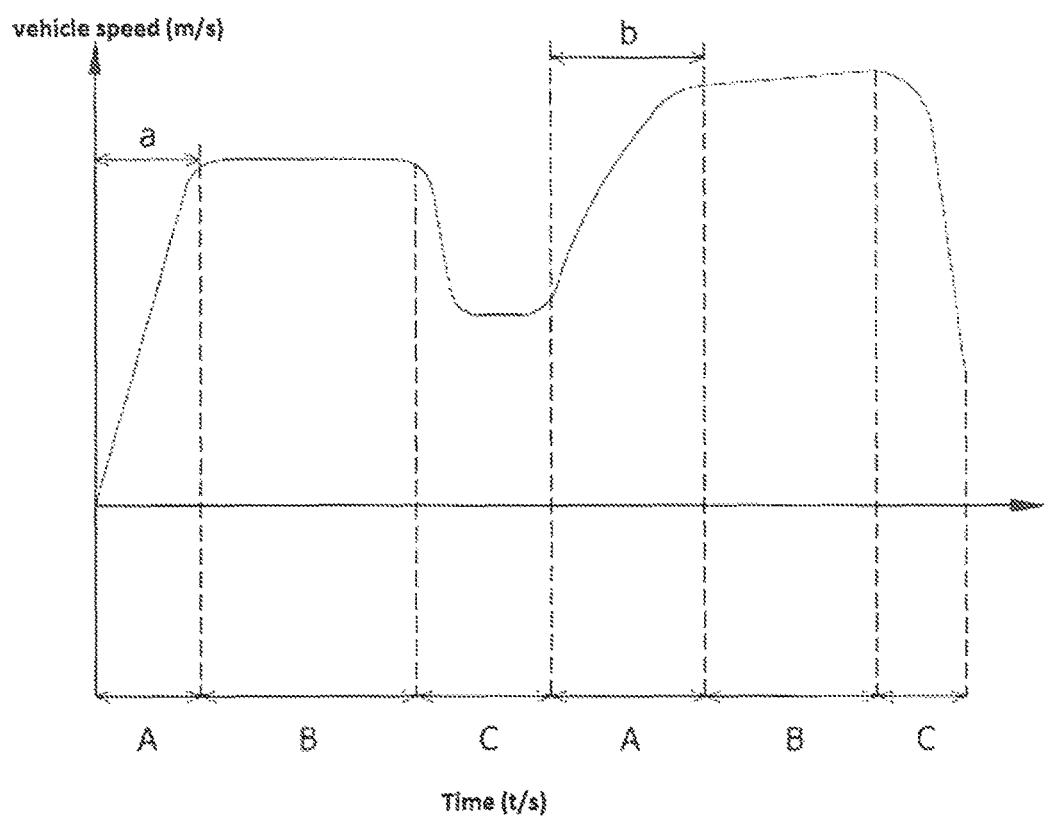
FIG. 1 is a graphical schematic view of a vehicle power use.
Figure 2:
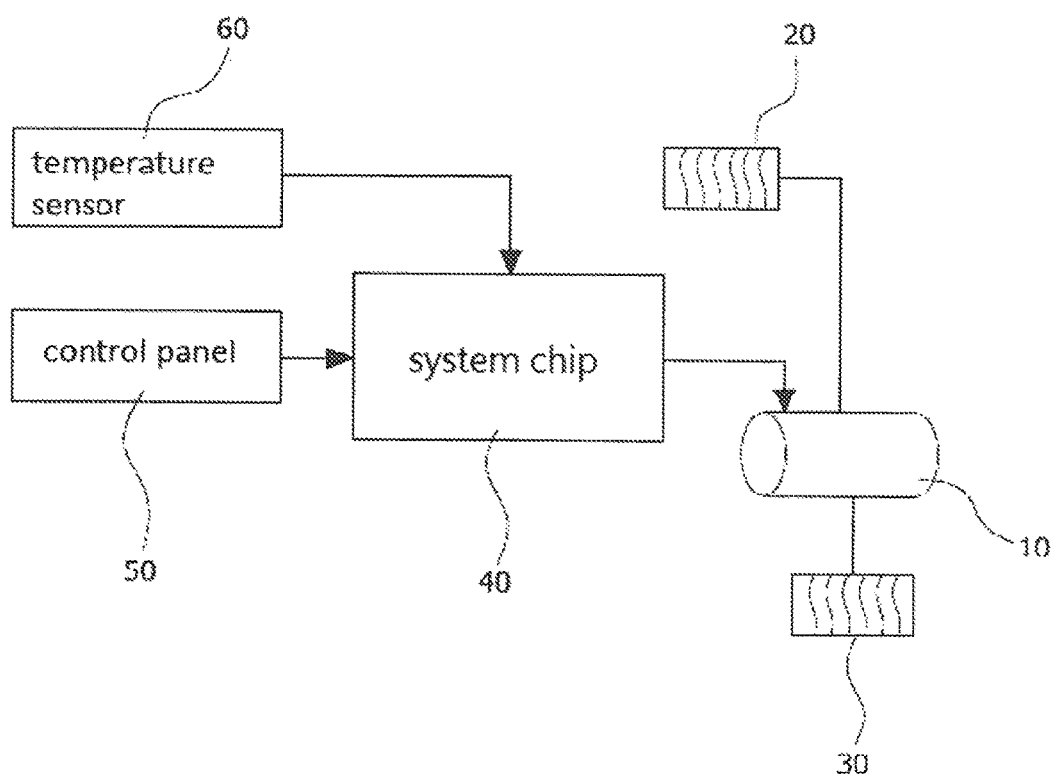
FIG. 2 is a block schematic view of vehicle air-conditioning system of the prior art.

Refer to FIG. 2, an air-conditioning compressor (10) of the conventional vehicle provides cooling air for vehicle, which is connected with an air-conditioning array (20) configured to emit cooling air and a heat-dissipating array (30) configured to exhaust hot air, wherein the air-conditioning compressor (10) is electrically connected with a system chip (40) which is responsible to start and close the air-conditioning system compressor and control operation for all the components of the air-conditioning system of the vehicle. The system chip (40) is also electrically connected with a control panel (50) through which a working signal can be transmitted to the system chip (40) to open and close the air-conditioning compressor (10). A temperature sensor (60) disposed inside the vehicle is electrically connected with the system chip (40) to sense temperature and obtain data, and provide the data to the system chip (40) to open and close the air-conditioning compressor (10).

In general, when we got in the car and turn on the air conditioning system for a while, and the temperature has reached to a desired temperature inside the car, the air conditioning compressor (10) will automatically turn oft when the temperature has reached above the desired degree, the air-conditioning compressor (10) will be activated again, so when the car is moving, the air-conditioning compressor (10) constantly keeps operation and alternately opens and closes, it is already a smart design. However, when the vehicle starts moving from the stop condition, simultaneously the air-conditioning compressor (10) is in operation.

The improved technical scheme of the present invention is provided by analyzing the power distribution between the engine and other auxiliary dynamic loads (air-conditioning compressor, air compressor, and generator), the analyses are as follows:

Analysis 1: the vehicle generator, mainly provide car subsidiary electrical systems, lighting systems, pumps, fans, batteries, the car battery is used to save and supply power, so when the car battery is fully charged, the generator will be shut down automatically, and the car generator is opened and closed repeatedly in cruising speed; so when the vehicle starts moving, the generator can be shut down for 9 to 38 seconds to release power.

Analysis 2: the air compressor of truck and bus is used to compress and store the air in a cylinder for braking and operating a pneumatic door, so when the truck or bus start moving, the air compressor also can be shut down to release the power.

Analysis 3: the battery of an electric car is used to drive the engine motor, if the battery power of the electric car can be regulated more correctly by the above mentioned technical scheme, the electric car can save more battery power and the battery will be lasted for longer.

Figure 3:
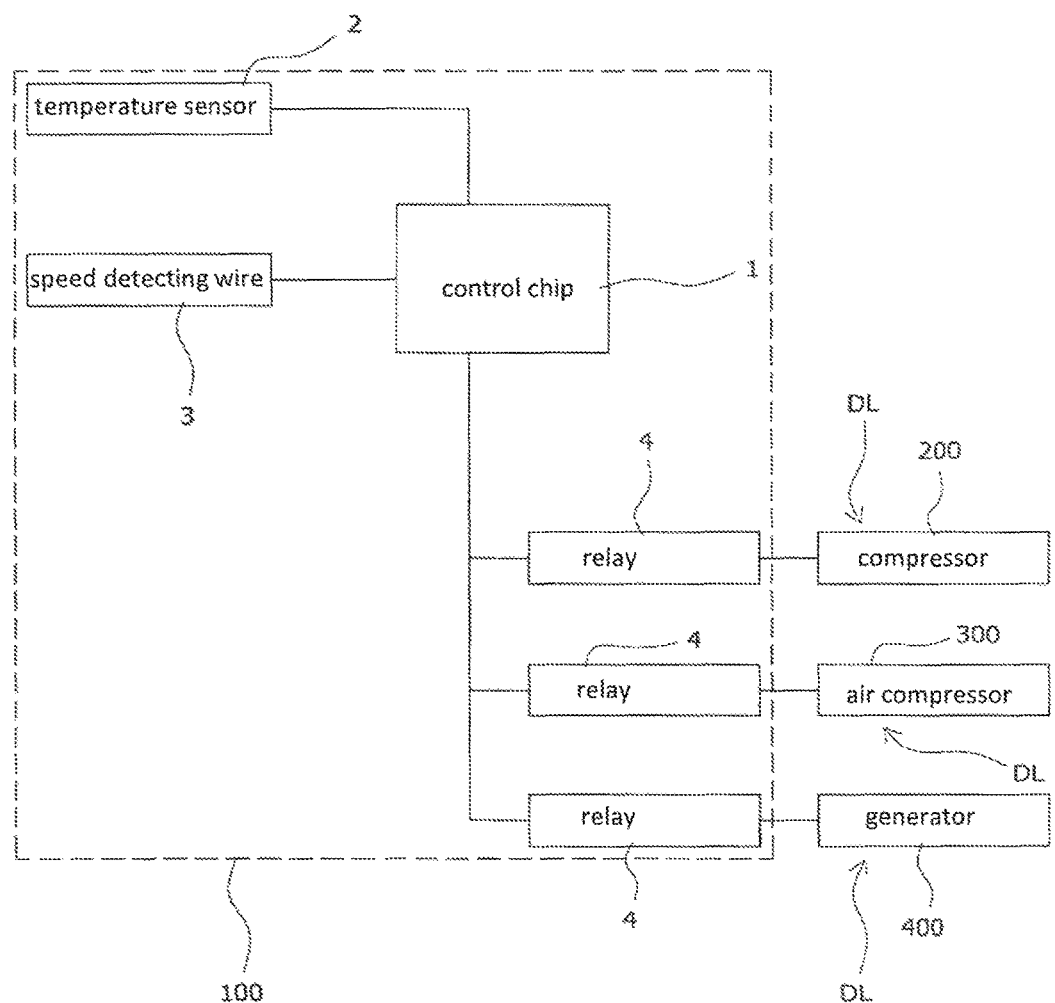
FIG. 3 is a block schematic view of first embodiment of the present invention.

The first embodiment as shown in FIG. 3 discloses a vehicle power adjusting device (100), applied in auxiliary dynamic loads on a vehicle, comprising: a control chip (1), a temperature sensor (2) electrically connected with the control chip (1), a speed detecting wire (3) electrically connected with the control chip (1), and a relay (4) disposed correspondingly to each auxiliary dynamic load, wherein the vehicle power adjusting device (100) is an external type device for the vehicle; the temperature sensor (2) configured to sense the temperature inside the vehicle; the speed detecting wire (3) configured to detect the vehicle speed; the relay (4) configured to start and close the auxiliary dynamic loads; when the vehicle starts moving or accelerates, or an throttle is increased, the control chip (1) can obtain the vehicle speed and temperature through the temperature sensor (2) and the speed detecting wire (3), and control operation of the relay (4) through a predetermined program installed therein.

Wherein the control chip (1) obtains the vehicle speed data by detecting a pulse signal transmitted from the speed detecting wire (3), obtains temperature data inside the vehicle through the temperature sensor (2), and then controls the opening and closing of the relay (4) with the obtained data calculated from a predetermined program installed thereof.

The speed detecting wire (3), or an electronic control unit is able to transmit the pulse signal, followed by rotation of a transmission shaft when the vehicle is moving, thereby detecting the vehicle speed, then the control chip (1) calculates the vehicle speed in accordance with density of the pulse signal.

When the vehicle stops, the pulse signal stops, by which the control chip (1) determines that the vehicle is stopped;

When the vehicle starts to move again, the speed detecting wire (3) starts to detect the vehicle speed and transmit the pulse signal to the control chip (1), by which the control chip (1) determines that the vehicle is in an insufficient power situation and transmit a closing signal to the relay (4) to shut down the auxiliary dynamic load for a few seconds, and to automatically restart later.

When the vehicle speed has changed over three kilometers, the auxiliary dynamic load will be shut down for a few seconds, and automatically restart later.

When the vehicle begins at cruising speed, followed by a reduced speed over fifteen kilometers per her (km/hr), and then accelerated the speed again over three km/hr, for example, when the vehicle has reduced speed from 60 to 40 km/hr and then accelerated to 43 km/hr, the control chip (1) will determine that it is reacceleration, this means it is in an insufficient power situation, thus the control chip (1) will shut down the auxiliary dynamic load for a few seconds, and automatically restart later.

After the temperature sensor (2) sensing the temperature inside the vehicle, the control chip (1) program will start to calculate and determine how much time to shut down the auxiliary dynamic load (such as a compressor 200), when the temperature inside the vehicle is 24 degrees Celsius, the auxiliary dynamic load will be shut down for 18 seconds; when the temperature inside the vehicle is 25 degrees Celsius, the degrees Celsius dynamic load will be shut down for 15 seconds; when the temperature inside the vehicle is 26 degrees Celsius, the auxiliary dynamic load will be shut down for 12 seconds; when the temperature inside the vehicle is 27 degrees Celsius, the auxiliary dynamic load will be shut down for 9 seconds; the higher the temperature inside the car, the shorter the closing time for the auxiliary dynamic load; and vice versa, when the temperature inside the vehicle is 23 degrees Celsius, the auxiliary dynamic load will be shut down for 23 seconds; when the temperature inside the vehicle is 22 degrees Celsius, the auxiliary dynamic load will be shut down for 28 seconds; when the temperature inside the vehicle is 21 degrees Celsius, the auxiliary dynamic load will be shut down for 33 seconds, the lower the temperature inside the car, the longer the closing time for auxiliary dynamic load.

The control chip (1) program is able to calculate and determine how much time to shut down and restart the relay (4) for controlling the auxiliary dynamic load.

Besides, the control chip (1) program also can convert the time to calculate how much time do the vehicle have been saved, how much carbon dioxide do the vehicle have been emitted, how much power efficiency do the vehicle have been improved, and how much restarting time the vehicle have been reduced.

Moreover, the vehicle power adjusting device (100) is an external type device that can be installed in a desired position for any kind of vehicles, thus the vehicle power adjusting device (100) can be applied in sedan, truck, hybrid, electric car, bus, and urban rail system to achieve saving the power efficiently.

When the vehicle just starts moving or reaccelerates, the vehicle power adjusting device (100) of the present invention is used to shut down the auxiliary dynamic load to release power for providing enough power to the vehicle, thereby providing enough power when the vehicle just starts moving, reducing acceleration time when the vehicle reaccelerates, and decreasing carbon emission. Besides, the auxiliary dynamic load can use the excess power to operate when the vehicle is at cruising speed and at slowing down, so as to achieve the purpose of saving energy.

Wherein the auxiliary dynamic load comprises at least one of following or a combination thereof: a compressor (200), an air compressor (300), and a generator (400).

The vehicle power adjusting device (100) can connect to different auxiliary dynamic loads through the relays (4), so as to improve more power efficiency, save more energy, and reduce more carbon emission.

Figure 4:
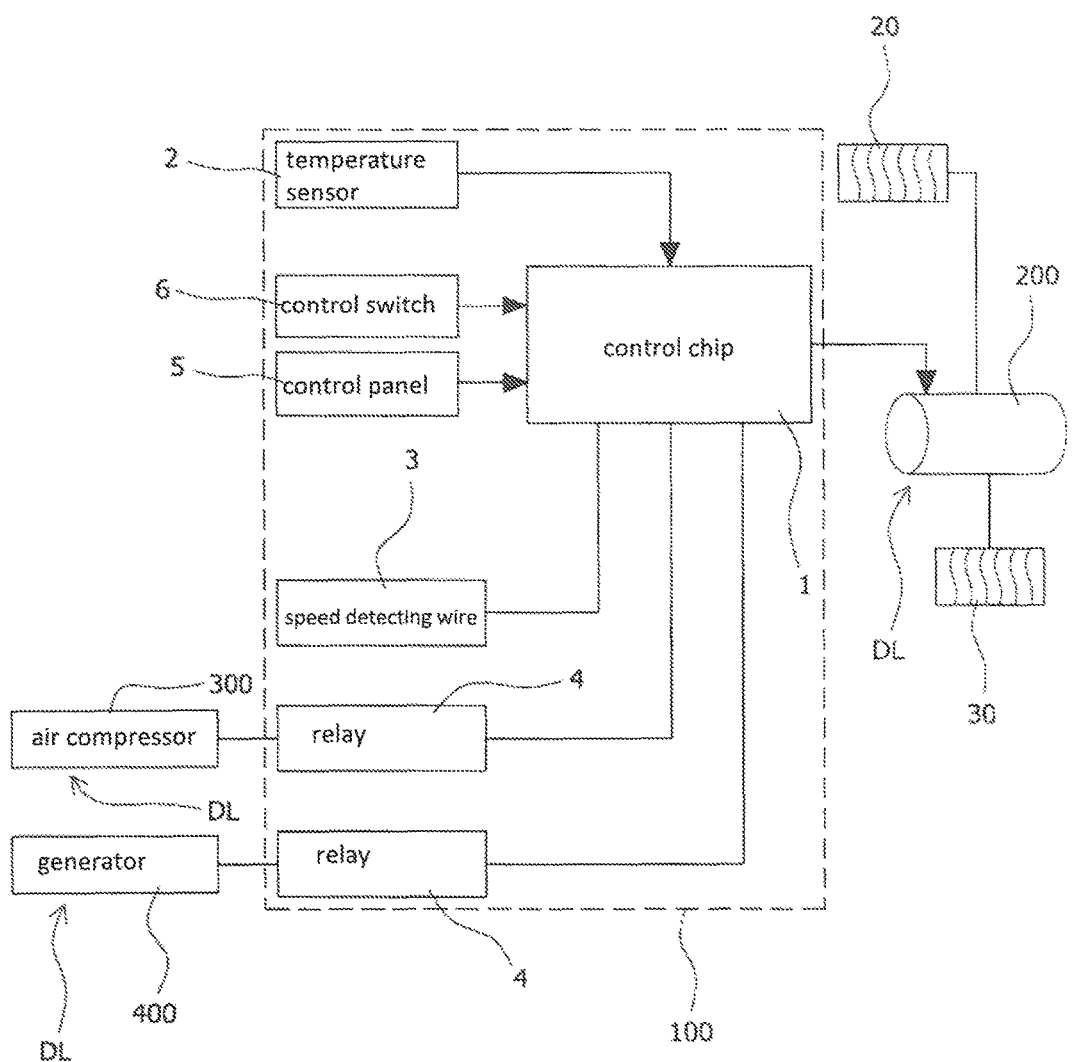
FIG. 4 is a block schematic view of second embodiment of the present invention.

The second embodiment as shown in FIG. 4A discloses a vehicle power adjusting device (100), applied in auxiliary dynamic loads on a vehicle, comprising: a control chip (1) electrically connected with the auxiliary dynamic loads, a temperature sensor (2) electrically connected with the control chip (1), a speed detecting wire (3) electrically connected with the control chip (1), a relay (4) disposed correspondingly to each auxiliary dynamic load, a control panel (5), and a control switch (6); wherein the vehicle power adjusting device (100) is an internal type device on the vehicle; the temperature sensor (2) configured to sense the temperature inside the vehicle; the speed detecting wire (3) configured to detect the vehicle speed; the control panel (5) disposed inside the vehicle for controlling operation of the vehicle; the control switch (6) disposed on the control panel (5) for controlling operation of the vehicle power adjusting device (100); the relay (4) configured to start and close the corresponding auxiliary dynamic loads;

when the vehicle just starts moving or reaccelerates, or an throttle is increased, the control chip (1) can obtain data of the vehicle speed and temperature through the temperature sensor (2) and the speed detecting wire (3), and then calculate the data via a predetermined program installed therein for controlling operation of the relay (4) and other auxiliary dynamic loads electrically connected therewith.

Wherein the vehicle power adjusting device (100) of the internal type is an control chip (1) that is installed originally inside the vehicle used for the control system of the vehicle, the control chip (1) is modified and added with software program which can be applied with the temperature sensor (2), the speed detecting wire (3), the relay (4), the control panel (5), and the control switch (6), so as to make the vehicle with the vehicle power adjusting function.

Besides, the control panel (5) and the control switch (6) are configured to open or close the vehicle power adjusting device (100)

Wherein the auxiliary dynamic load comprises at least one of following or a combination thereof: a compressor (200), an air compressor (300), a generator (400); wherein the auxiliary dynamic load being electrically connected with the control chip (1) is the compressor (200).

The vehicle power adjusting device (100) can connect to different auxiliary dynamic loads through the relays (4), so as to improve more power efficiency, save more energy, and reduce more carbon emission.

Wherein the compressor (200) is the auxiliary dynamic load electrically connected with the control chip (1), the compressor (200) can be adjusted smoothly and stably by the control chip (1) in remaining the original system structure.

Wherein the control chip (1) shut down the relay (4) for 9 to 38 seconds based on the temperature inside the vehicle provided by the temperature sensor (2) and/or the speed provided by the speed detecting wire (3).

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A vehicle power adjusting device (100), simultaneously applied in auxiliary dynamic loads on a vehicle, comprising:
a control chip (1), a temperature sensor (2) electrically connected with the control chip (1), a speed detecting wire (3) electrically connected with the control chip (1), and a relay (4) disposed correspondingly to each auxiliary dynamic load, wherein the vehicle power adjusting device (100) is an external type device that can be installed in a desired position on the vehicle;
the temperature sensor (2) configured to sense the temperature inside the vehicle;
the speed detecting wire (3) configured to detect the vehicle speed;
the relay (4) configured to start and close the auxiliary dynamic loads;
when the vehicle just starts moving or reaccelerates, or an throttle is increased, the control chip (1) can obtain data of the vehicle speed and temperature through the temperature sensor (2) and the speed detecting wire (3), and then calculate the data via a predetermined program installed therein for controlling operation of the relay (4);
wherein the control chip (1) can shut down the relay (4) for 9 to 38 seconds according to the temperature inside the vehicle provided by the temperature sensor (2);

wherein the auxiliary dynamic load includes a compressor (200), an air compressor (300), and an alternator (400).

2. A vehicle power adjusting device (100), simultaneously applied in auxiliary dynamic loads on a vehicle, comprising:
- a control chip (1) electrically connected with the auxiliary dynamic loads, a temperature sensor (2) electrically connected with the control chip (1), a speed detecting wire (3) electrically connected with the control chip (1), a relay (4) disposed correspondingly to each auxiliary dynamic load, a control panel (5), and a control switch (6); wherein the vehicle power adjusting device (100) is an internal type device on the vehicle;
- the temperature sensor (2) configured to sense the temperature inside the vehicle;
- the speed detecting wire (3) configured to detect the vehicle speed;
- the control panel (5) disposed inside the vehicle for controlling operation of the vehicle;
- the control switch (6) disposed on the control panel (5) for controlling operation of the vehicle power adjusting device (100);
- the relay (4) configured to start and close the corresponding auxiliary dynamic loads;
- when the vehicle just starts moving or reaccelerates, or an throttle is increased, the control chip (1) can obtain data of the vehicle speed and temperature through the temperature sensor (2) and the speed detecting wire (3), and then calculate the data via a predetermined program installed therein for controlling operation of the relay (4) and other auxiliary dynamic loads electrically connected therewith;
- wherein the control chip (1) shut down the relay (4) for 9 to 38 seconds based on the temperature inside the vehicle provided by the temperature sensor (2) and the speed provided by the speed detecting wire (3);
- wherein the auxiliary dynamic load includes a compressor (200), an air compressor (300), and an alternator (400).

* * * * *